Oct. 25, 1955 E. DAVIES 2,721,909
GAIN CONTROL CIRCUIT ARRANGEMENTS
Filed Oct. 17, 1952
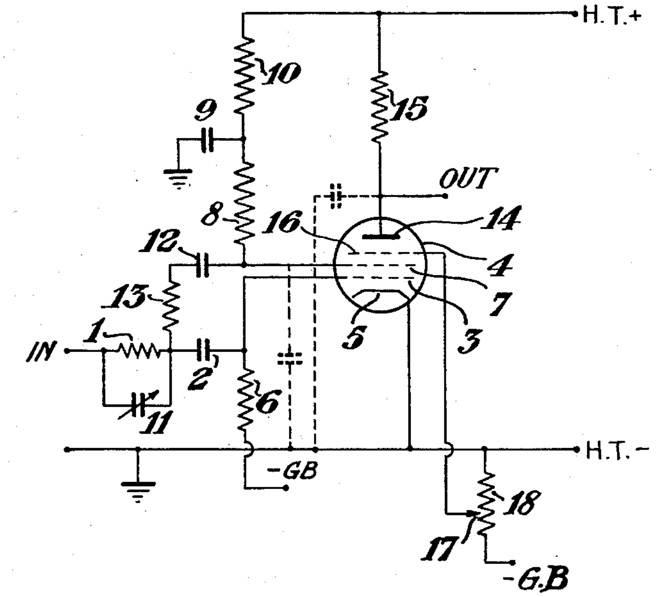
Inventor:
Eric Davies
By his Attorneys
Baldwin & Wight

United States Patent Office 2,721,909

Patented Oct. 25, 1955

2,721,909

GAIN CONTROL CIRCUIT ARRANGEMENTS

Eric Davies, Burnham-on-Crouch, England, assignor to Marconi's Wireless Telegraph Company Limited, London, England, a company of Great Britain

Application October 17, 1952, Serial No. 315,321

Claims priority, application Great Britain January 24, 1952

2 Claims. (Cl. 179—171)

This invention relates to gain control circuit arrangements and has for its object to provide improved gain control circuit arrangements well adapted for the gain control of video signal and other wide band amplifiers, and which shall be such, that undesired non-linear and change of frequency response effects shall not accompany the adjustment of gain.

It is often desired, notably in television transmitters, to effect remote or other control of the gain of wide band amplifiers without introducing appreciable non-linear effects or changes of frequency response as a result of the adjustment of gain and great difficulties have been experienced hitherto in satisfying these requirements in a simple, efficient and economical manner. The present invention seeks to overcome these difficulties.

According to this invention a gain control circuit arrangement comprises a valve to which signal input is applied and from which signal output is taken, means for deriving from an intermediate point in the electron stream of said valve a voltage which is utilized as a negative feedback voltage to ensure linearity of electron stream modulation up to the point in said stream at which the negative feed back voltage is derived, and means for effecting gain control by adjusting the voltage of an electrode inserted in the part of the electron stream beyond said point i. e. on the side thereof remote from the cathode.

The principle of the invention thus consists in applying linearizing feedback to ensure substantially linear modulation over the first portion of the electron stream of a valve by sampling the said stream to derive a signal which is used for negative feed back, and then effecting gain control in a later portion of the stream so that the current in the output circuit is related to the gain control voltage.

In carrying out the invention the adjustment of the gain control voltage may be effected manually or automatically in accordance with well known technique as may be desired.

Although the invention is not limited to the use of any particular type of valve (provided, of course, the valve has sufficient grids for carrying out the invention) it may most conveniently be practised by using a pentode valve.

In a preferred embodiment using a pentode valve a signal load is included in the screen grid circuit thereof and voltage derived therefrom is employed as negative feedback directly or indirectly on the control grid, gain control voltage adjustment being effected at the suppressor grid.

The invention is illustrated in the accompanying drawing which shows diagrammatically a preferred embodiment thereof. Suitable sizes for various circuit elements in the drawing are given parenthetically and by way of example only in the description which follows.

Referring to the drawing, input signals, for example video signals, are applied at IN through a resistance 1 (10,000 ohms) and a condenser 2 to the control grid 3 of a pentode 4. The cathode 5 of the valve is earthed and the control grid 3 is connected through a resistance 6 to a terminal —GB at which a suitable grid bias voltage (—3 volts) is applied. The screen grid 7 is connected through a resistance 8 (1000 ohms) and a condenser 9 (100 microfarads) to earth and is also connected through the said resistance 8 in series with a further resistance 10 (22,000 ohms) to a terminal HT+ where suitable anode voltage is applied. The resistance 1 is shunted by a condenser 11 which may be adjustable. The screen grid 7 is connected through a condenser 12 in series with a resistance 13 (10,000 ohms) and the condenser 2 already referred to, to the control grid 3 so as to provide a negative feed back circuit. The anode 14 of the valve is connected to HT+ through a resistance 15 (330 ohms) and output is taken from the anode at the terminal OUT. The HT— connection is made to earth. The suppressor grid 16 is connected to an adjustable tap 17 on a potentiometer resistance 18, one terminal of which is earthed and the other terminal of which is connected to a source of suitable potential (—10 volts). The condensers indicated in broken lines between the anode and earth and between the screen grid and earth represent the self-capacities to earth of these electrodes.

With this arrangement the resistance 8 constitutes a signal load resistance in the screen grid circuit of the pentode and the voltage set up across it is used to provide negative feedback to the control grid, this being done directly in the circuit shown through circuit elements 12, 13 and 2.

In the circuit illustrated the ratio of the resistances 1 and 13 determines the amount of feed back and the condenser 11 is adjusted to compensate for the input capacity of the valve. Provided the time constants due respectively to the resistance 15 in conjunction with the anode-to-earth capacity and the resistance 8 in conjunction with the screen grid-to-earth capacity are the same, the frequency response at the anode output will be the same as for an identical amount of feed back derived from the anode circuit. The resistance 10 is provided to ensure that when the suppressor grid is biased for anode current cut-off the screen grid dissipation remains within permissible limits.

It is important that no signal modulation shall occur between the suppressor grid and the cathode, as any non-linearity introduced here will not be corrected by feed back. From a direct current point of view the resistance 10 assists in obtaining a linear control characteristic as the screen grid voltage falls when the anode current is cut off.

In practice, a substantial linear control of output is obtainable from full output down to about 5% thereof and the linearity and frequency response actually improve as the output is reduced due to the increased feed back from the screen grid to control grid. This is another factor which makes for the obtaining of linearity of control characteristics.

I claim:

1. A thermionic valve circuit having a gain control arrangement and comprising a thermionic valve having an input circuit and an output circuit, a cathode at ground potential and at least three grids interposed in the electron stream between the cathode and plate, said grids being disposed at progressively increasing distances from said cathode, a circuit connection between said first grid and said input circuit, the second of said grids being connected to derive a signal from the electron stream, means for applying signal energy as negative feedback to the grid nearer the cathode, whereby substantial linear modulation over the first portion of the electron stream of the valve is obtained, a signal load connected to said second grid, a signal load connected to said plate and so dimensioned that the time constant of the signal load of the said plate and the self-capacitance of said plate to ground is substantially the same as the time constant of the signal load of the second grid and the self-capacitance of the second grid to ground, and means for applying a gain control voltage to the third grid to effect gain control in a later portion of the electron stream of said valve to control the current in said output circuit in dependence upon said gain control voltage.

2. A thermionic valve circuit having a gain control arrangement and comprising a thermionic valve having an input circuit and an output circuit, a cathode at ground potential and three grids interposed in the electron stream between the cathode and the plate, said grids being disposed at progressively increasing distances from said cathode, a circuit connection between said first grid and said input circuit the second of said grids being connected to derive a signal voltage from an intermediate point in the electron stream of said valve, means for applying said voltage as negative feedback to the first grid of said valve, whereby linearity of the electron stream modulation is obtained up to said intermediate point, a signal load connected to said second grid, a signal load connected to said plate and so dimensioned that the time constant of the signal load of the said plate and the self capacitance of said plate to ground is the same as the time constant of the signal load of the second grid and the self-capacitance of the second grid to ground, the third grid electrode of said valve being inserted in said electron stream beyond said intermediate point and means for applying an adjustable voltage to said electrode to control the gain.

References Cited in the file of this patent

UNITED STATES PATENTS

| | | |
|---|---|---|
| 2,232,850 | Haantjes et al. | Feb. 25, 1941 |
| 2,315,043 | Boucke | Mar. 30, 1943 |
| 2,497,835 | Loper | Feb. 14, 1950 |